United States Patent Office 3,500,912
Patented Mar. 17, 1970

3,500,912
MOLECULAR WEIGHT OF SURFACTANT INFLUENCING THE THERMOSTABILITY OF MICELLAR DISPERSIONS
John A. Davis, Jr., and William J. Kunzman, Littleton, Colo., assignors to Marathon Oil Company, Findlay, Ohio, a corporation of Ohio
No Drawing. Filed July 22, 1968, Ser. No. 754,524
Int. Cl. E21b 43/22, 47/06; B01j 13/00
U.S. Cl. 166—252                                    19 Claims

ABSTRACT OF THE DISCLOSURE

Thermostability range of micellar dispersions useful to recover crude oil in a secondary or a tertiary oil recovery process can be shifted to higher temperatures by increasing the molecular weight of the surfactant used to obtain the micellar dispersion. These dispersions are especially useful in flooding subterranean formations wherein the temperature is above 80° F.

BACKGROUND OF THE INVENTION

U.S. Patent No. 3,254,714 to Gogarty et al. teaches that micellar dispersions are useful in flooding subterranean oil-bearing formations to recover crude oil therefrom. These micellar dispersions are generally composed of a hydrocarbon, aqueous medium, and surfactant.

It is generally accepted within the petroleum industry that the normal temperature gradient of the subsurface is about 1° F. per 60 feet. Thus, at reservoir depths of about 4000 feet, temperatures up to and above about 150° F. can be encountered. At such high temperatures, the micellar dispersion can become unstable, that is, exhibit a two-phase system, thus indicating emulsion characteristics.

Applicants have discovered that by increasing the molecular weight of surfactant within the micellar dispersion, the thermostability range of the dispersion can be shifted to higher temperatures. Thus, at temperatures in excess of 150° F., an otherwise unstable micellar dispersion, i.e. an emulsion, can be designed to be thermally stable. In addition, subterranean formations at temperatures exceeding 80° F. can be flooded efficiently with the teaching of this invention.

The term "thermostability" as used herein means thermodynamically stable, i.e. a system below or above the thermostability temperature range will exhibit two or more distinct layers or phases, indicating an unstable system or an emulsion.

DESCRIPTION OF THE INVENTION

The term "micellar dispersion" as used herein is meant to include "micoemulsion" [Schulman and Montagne, Annals of the New York Academy of Sciences, 92, pp. 366–371 (1961)], oleopathic hydro-micelles [Hoar and Schulman, Nature, 152, p. 102 (1943)], "transparent" emulsions (Blair, Jr. et al., U.S. Patent No. 2,356,205), and micellar solution technology taught in C. G. Sumner's, Clayton's, The Theory of Emulsions and Their Technical Treatment, 5th edition, pp. 315–320 (1954) and micellar solutions. Examples of micellar solutions include those defined in U.S. Patents Nos. 3,254,714; 3,275,075; 3,301,325; and 3,307,628.

The micellar dispersions are composed essentially of hydrocarbon, aqueous medium, and surfactant. Cosurfactant. Cosurfactant(s) and electrolyte(s) can also be incorporated into the micellar dispersion. Examples of volume amounts include 4–60% or more hydrocarbon, 20–90% aqueous medium, at least about 4% surfactant, 0.01–20% cosurfactant and 0.001–4% or more (weight percent based on aqueous medium) of electrolyte. The micellar dispersions can be oil external or water external.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gasess. Pure hydrocarbons are also useful, e.g. paraffin compounds including propane, pentane, heptane, decane, dodecane, etc.; cycloparaffinic compounds including cyclohexane, etc.; aryl compounds including benzene, naphthalene, anthracene, etc. and alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft water, brackish water or brine water. Preferably, the water is soft but it can contain small amounts of salts which can be characteristic of the ions within the subterranean formation being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidine sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate. Other useful surfactants include Duponol WAQE (a 30% active sodium lauryl sulfate marketed by Du Pont Chemical Corporation, Wilmington, Del.), Energetic W–100 (a polyoxyethylene alkyl phenol marketed by Armour Chemical Company, Chiicago, Ill.), TritonX–100 (an alkylphenoxy polyethoxy ethanol marketed by Rohm & Haas, Philadelphia, Pa.) and Arquad 12–50 (a 50% active dodecyl trimethyl ammonium chloride marketed by Armour Chemical Company, Chicago, Ill.), and like materials.

Preferably, the surfactant is a petroleum sulfonate, also known as alkyl aryl naphthenic sulfonate, and preferably containing a monovalent cation. Examples of preferred surfactants are the sodium and ammonium petroleum sulfonates having an average molecular weight of from about 360 to about 520, and more preferably from about 420 to about 470. The surfactant can be a mixture of low and high molecular weight sulfonate or a mixture of two or more different surfactants.

Examples of useful cosurfactants, also known as cosolubilizers and semi-polar organic compounds, include alcohols, amino compounds, esters, aldehydes and ketones containing from 1 to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and primary and secondary hexanols. Concentrations of from about 0.01% to about 20% by volume of cosurfactant are useful in the micellar dispersion and more preferably from about 0.1 to about 5.0%. Mixtures of two or more cosurfactants are useful.

Electrolytes useful within the micellar dispersions include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in U.S. Patent No. 3,330,343. The type and concentration of electrolyte will depend on the aqueous medium, surfactant, cosurfactant, hydrocarbon and the reservoir temperature. Generally from about 0.001% to about 4% or more, weight percent based on the aqueous medium, of electrolyte is useful. The electrolyte can be the salts within brackish or brine water.

The mobility of the micellar dispersion is desirably about equal to or less than the mobility of the formation fluids (i.e. combination of crude oil and interstitial water) ahead of the dispersion. Preferably, the micellar solution has a mobility favorable to protecting against viscous instability.

Size of the micellar dispersion slug useful with this invention is from about 1% to about 20% formation pore volume. Larger pore volumes are useful but such may be economically unattractive. More preferably, from about 2% to about 10% formation pore volumes are useful and from about 3% to about 6% formation pore volumes give very efficient oil recovery results.

The micellar dispersion is designed to be thermally stable at the temperature of the formation by increasing the molecular weight of the surfactant. The particular molecular weight required to stabilize the micellar dispersion at formation temperature can be determined by routine laboratory methods. In addition, the thermostability of micellar dispersion will be secondarily dependent upon the particular hydrocarbon, the cosurfactant, the amount of electrolyte within the micellar dispersion, etc. A dispersion thermally stable at high temperatures may not necessarily be thermally stable at ambient temperatures.

The micellar dispersion should be compatible with the formation rock and the connate water within the formation. Thus, the components within the micellar dispersion will depend upon the particular reservoir being flooded.

The following examples are presented to specifically illustrate working embodiments of the invention. Such examples are not to be interpreted as limiting the invention, but equivalents known to those skilled in the art should be interpreted within the scope of the invention as defined by the specification and appended claims. Unless otherwise specified, percents are based on volume.

Example 1

Two micellar dispersions are obtained by mixing 60.9% crude column overheads, 4.8% isopropanol, 19.1% distilled water, and 15.2% sodium sulfonate (dispersion No. 1 has an average molecular weight of about 430 and dispersion No. 2 an average molecular weight of about 500, both sulfonates based on about 62% active sulfonate). These two different micellar dispersions are tested for thermostability at lower and higher temperature limits (i.e., at temperatures below the lower temperature limit and at temperatures above the upper temperature limit the fluid separates into two distinct layers or phases). Micellar dispersion No. 1 indicated a lower temperature limit of 54° F. and an upper temperature limit of 200° F. whereas micellar dispersion No. 2 indicated a lower temperature limit of 117° F. and an upper temperature limit of 200°+ F.

Example 2

Four micellar dispersions samples composed of 60.9% crude column overheads, 4.8% isopropanol, 19.1% distilled water, and 15.2% of a sodium petroleum sulfonate (composed of about 62% active sulfonate and having average molecular weights indicated in Table I) are tested for lower and upper temperature limits of thermostability. Test data are indicated in Table I:

TABLE I

| Micellar Dispersion No. | Average Molecular Wgt. | Thermostability Range (° F.) | |
|---|---|---|---|
| | | Lower Limit | Upper Limit |
| 1 | 430 | 34 | 100 |
| 2 | 445 | 42 | 155 |
| 3 | 465 | 43 | 218 |
| 4 | 500 | 110 | 310 |

What is claimed is:
1. A process of recovering crude oil from oil-bearing subterranean formations having at least one production means and at least one injection means in fluid communication therewith, the process comprising determining the temperature of the formation, injecting into and displacing through the formation a micellar dispersion comprised of hydrocarbon, aqueous medium, and surfactant characterized in that the molecular weight of the surfactant is increased sufficiently to stabilize the mixture of micellar dispersion constituents at the formation temperature.

2. The process of claim 1 wherein the mixture of micellar dispersion constituents contains cosurfactant.

3. The process of claim 1 wherein the formation temperature is in excess of about 80° F.

4. The process of claim 1 wherein the formation temperature is in excess of about 150° F.

5. The process of claim 1 wherein the formation temperature is in excess of about 200° F.

6. The process of claim 1 wherein the surfactant is a petroleum sulfonate containing a monovalent cation.

7. The process of claim 1 wherein the average molecular weight of the sulfonate is within the range of from about 360 to about 520.

8. The process of claim 1 wherein the mixture of micellar dispersion constituents contains electrolyte.

9. A process of recovering crude oil from an oil-bearing subterranean formation having at least one production means and at least one injection means in fluid communication therewith, comprising determining the temperature of the formation to be in excess of about 80° F., injecting and displacing through the formation a micellar dispersion comprised of hydrocarbon, aqueous medium, cosurfactant, and surfactant characterized in that the molecular weight of the surfactant is increased sufficiently to stabilize the mixture of micellar dispersion constituents at the formation temperature.

10. The process of claim 9 wherein the mixture of micellar dispersion constituents contains electrolyte.

11. The process of claim 9 wherein the temperature of the formation is in excess of about 150° F.

12. The process of claim 9 wherein the temperature of the formation is in excess of about 200° F.

13. The process of claim 9 wherein the cosurfactant is an alcohol containing from one to about 20 carbon atoms.

14. The process of claim 9 wherein the surfactant is petroleum sulfonate containing monovalent cation.

15. A method of increasing the thermostability range of a micellar dispersion comprised of hydrocarbon, aqueous medium and surfactant to higher temperature ranges, the method comprising increasing the molecular weight of the surfactant.

16. The method of claim 15 wherein the surfactant is a petroleum sulfonate having an average molecular weight within the range of from about 360 to about 520.

17. The method of claim 15 wherein the micellar dispersion contains cosurfactant.

18. The method of claim 17 wherein the cosurfactant is alcohol containing from 1 to about 20 carbon atoms.

19. The method of claim 15 wherein the micellar dispersion contains electrolyte.

References Cited

UNITED STATES PATENTS

| | | | |
|---|---|---|---|
| 3,041,275 | 6/1962 | Lummus et al. | 252—309 X |
| 3,234,143 | 2/1966 | Waldmann | 252—309 |
| 3,254,714 | 6/1966 | Gogarty et al. | 166—274 |
| 3,297,084 | 1/1967 | Gogarty et al. | 166—273 |
| 3,301,325 | 1/1967 | Gogarty et al. | 166—274 |
| 3,330,343 | 7/1967 | Tosch et al. | 166—273 |
| 3,330,344 | 7/1967 | Reisberg | 166—274 |
| 3,346,494 | 10/1967 | Robbins et al. | 252—312 X |
| 3,348,611 | 10/1967 | Reisberg | 166—275 |

STEPHEN J. NOVOSAD, Primary Examiner

U.S. Cl. X.R.

166—275; 252—309, 312